United States Patent [19]
Tagami et al.

[11] Patent Number: 4,535,335
[45] Date of Patent: Aug. 13, 1985

[54] FIXED RANGE INDICATING SYSTEM FOR USE IN A VEHICLE TRAVEL PATH INDICATING APPARATUS

[75] Inventors: Katsutoshi Tagami; Tsuneo Takahashi, both of Saitama; Shinichiro Yasui, Tokyo; Masao Sugimura, Saitama, all of Japan

[73] Assignee: Honda Giken Kogyo Kabushiki Kaisha, Tokyo, Japan

[21] Appl. No.: 637,342

[22] Filed: Aug. 3, 1984

[30] Foreign Application Priority Data

Oct. 27, 1980 [JP] Japan ................. 55-150370

[51] Int. Cl.$^3$ .............................................. G06F 15/50
[52] U.S. Cl. ..................... 340/995; 340/988; 364/449; 364/424
[58] Field of Search ............... 340/988, 989, 990, 992, 340/993, 994, 995; 364/424, 434, 449

[56] References Cited

U.S. PATENT DOCUMENTS

| 4,024,493 | 5/1977 | Ingels | 340/995 |
| 4,139,889 | 2/1979 | Ingels | 340/995 |
| 4,192,002 | 3/1980 | Draper | 340/995 |
| 4,196,473 | 4/1980 | Chea | 364/449 |
| 4,240,108 | 12/1980 | Levy | 340/995 |
| 4,312,577 | 1/1982 | Fitzgerald | 340/995 |
| 4,402,050 | 8/1983 | Tagami et al. | 340/995 |
| 4,484,284 | 11/1984 | Tagami et al. | 364/449 |

Primary Examiner—Gerald L. Brigance
Attorney, Agent, or Firm—Irving M. Weiner; Pamela S. Burt

[57] ABSTRACT

An improved fixed range or distance indicating system for use in a visual travel route indicating apparatus of a vehicle. The fixed range indicating system minimizes memory capacity by discretely storing locational data obtained from discrete arithmetical calculation made at a suitable predetermined interval to present relatively short vector segments optimized in accordance with the given scale of indication on the display and at the same time provides a relatively high accuracy in approximating a current locational indication of the vehicle. A plurality of basic scales of indication varying with doubled denominators in accordance with a given variety of basic scales of indication are presented, the locational data are picked-up discretely at a rate corresponding to the plurality of basic scales of indication, and the thus picked-up locational data is stored into prescribed memory tables within a given limit of indication by way of an endless store mode. The current indicated path of travel on the display is erased at the interval of a fixed range travelled by the vehicle corresponding to the basic scales of indication, and refreshed points of indication are determined for a new location of the vehicle in accordance with a given scale of indication from the current points of indication for the current location at the time of erasing on the basis of the locational data read out from the memory table.

1 Claim, 4 Drawing Figures

FIXED RANGE INDICATING SYSTEM FOR USE IN A VEHICLE TRAVEL PATH INDICATING APPARATUS

BACKGROUND OF THE INVENTION

This is a continuation of application Ser. No. 314,399, filed Oct. 23, 1981, now abandoned.

1. Field of the Invention

The present invention relates generally to an improved visual travel route indicating apparatus, for use in an automotive vehicle and the like, which provides a visual display of combined information as to a current status of travel of the vehicle, such as a current location, path of travel, travel direction, etc. More particularly, the invention relates to an improved fixed range or distance indicating system, for use in a visual travel route indicating apparatus of a vehicle, specifically designed to present an efficient travel path indication capability corresponding to a given scale of indication on the display during travel.

2. Description of Relevant Art

A variety of apparatus have been developed for preventing the driver of an automobile or the like from losing his way while driving at night or in unfamiliar surroundings away from his desired route of travel. Such apparatus have generally been designed to indicate continuously or discretely a due current position or similar information relating to the vehicle. Such indication is provided on an indication panel or display screen including a related road map or the like disposed at the driver's seat. The driver is thus provided with a suitable ready guidance relating to the vehicle's current status of travel with respect to a desired course of travel.

With reference to FIG. 1 of the accompanying drawings, there is shown a typical basic circuit construction of a travel route indicating apparatus. The apparatus comprises a pulse generator 1 adapted to generate an electric pulse signal corresponding to a current travel distance of a vehicle, and a bearing detection unit 2 adapted to output an electric signal proportional to a current bearing or a variation of the heading of the vehicle corresponding to a current travel direction thereof with respect to a predetermined reference including, for instance, a rate type gyroscope adapted to detect an angular velocity in the yawing plane. A signal processing unit or central processing unit (CPU) 3 is adapted to count the electric pulses from the pulse generator 1 so as to measure the current travel distance or range of the vehicle, and to determine the current travel direction of the vehicle from the output from the bearing detection unit 2. Further, the CPU 3 arithmetically obtains a current position on the two-dimensional coordinates at an interval of a predetermined unit travel distance of the vehicle in accordance with the detection signals from both the pulse generator 1 and the detection unit 2, while centrally controlling the entire apparatus. A path of travel storage unit or random access memory (RAM) 4 is adapted to sequentially store data as to the discrete positions or spots on the two-dimensional coordinates which vary from time to time and are obtained by the signal processing unit 3, and hold the data as finite and continuous information on the positions corresponding to the locations of the vehicle. A display unit 5 including a CRT display, a liquid crystal display, etc. is adapted to visually indicate information as updated from time to time, such as a current travel distance of the vehicle, a path of travel for a given zone to the current location, and a current travel direction and the time required in accordance with the output from the signal processing unit 3. A manual operating unit 6 is adapted to appropriately modify the settings such as of a directional change in the path of travel of the vehicle as visually indicated on the display unit 5, a shift of the position of such indication, a partially enlarged indication of the path of travel, a manual selection of a scale of indication, et., and to retrieve the path of travel of the vehicle, accordingly.

With the above-described construction of the vehicle travel route indication apparatus according to this typical arrangement, it is to be noted that a predetermined starting or reference point of the vehicle motion and a desired scale of indication are first manually preset on the display unit 5 in accordance with a road map displayed thereon by using the manual operating unit 6. After such procedures, and when the vehicle commences travel, a single electric pulse signal is sent at an interval of unit travel distance 1 from the pulse generator 1 to the signal processing unit 3, where the number of pulses is counted so as to measure a current travel distance of the vehicle, while also sending the output from the bearing detection unit 2 to the signal processing unit 3 so as to determine a current cruising direction or heading of the vehicle at each moment. The signal processing unit 3, as directed above, operates to arithmetically obtain from time to time a current location or graphic point (x, y) on the X-Y coordinates in the preselected scale of indication on the display unit 5 in accordance with the current travel distance and the current variation of the heading of the vehicle which were detected in the manner described above. The results of such operation are sequentially sent to the display unit 5, and also to the path of travel storage unit (RAM) 4 so as to be stored therein. The thus-stored data is constantly read out to be continuously fed into the display unit 5. At the same time, an azimuthal signal indicating the heading of the vehicle is sequentially sent out from the signal processing unit 3 to the display unit 5.

More specifically, as typically shown in FIG. 2, these inputs to the display unit 5 from both the path of travel storage unit 4 and signal processing unit 3 are adapted to visually indicate on the display unit 5 by way of an azimuthal indication mark M1 appearing at the current location B of the vehicle and a path of travel indication mark M2 showing the path of travel from the predetermined starting or reference point A over to the current position B of the vehicle in a simulated manner to follow the current travel route of the vehicle. On the other hand, the mark M1 showing the current location B is indicated in such a manner that, amongst mark information symbols such as a plurality of triangle-shaped arrow heads or the like having predetermined directivity stored preliminarily in an ROM provided in the signal processing unit 3, an appropriate mark information symbol of a suitable directivity addressed by a current bearing detection signal is sent to the display unit 5, so that it may be accordingly indicated together with the indication of the current location of the vehicle. At the same time, in order that the vehicle's driver may check a current location of the vehicle along the path of travel as desired, a retrieval mark M3 may be placed anywhere along the path of travel indication mark M2 indicated on the display unit 5, upon a manual operation of the manual operating unit 6.

In addition, the display unit 5 is also arranged, as exemplified in FIG. 2, such that additional auxiliary indications may be indicated in accordance with the signals so supplied from the signal processing unit 3. Such auxiliary indications may include, for example, an indication of time D1 required in the vehicle's travel, for instance, from a predetermined reference point to the current location B (which is adaptable by the use of a suitable timer incorporated in the signal processing unit 3 so as to work during the time period that the vehicle travels); an indication of the current total mileage with the mark D2 up to that location B; or an indication of display scale with the mark D3 selected by way of the manual operating unit 6, as desired.

Because there is a natural physical or spatial limit in the visual indication of the path of travel of the vehicle on the display screen having a finite display area, when the path of vehicle travel extends out of such extremity of the display screen as the vehicle proceeds in its travel, it may be arranged that a new or refreshed starting or reference point A' is set (when the contents stored in the travel path storage unit 4 is cleared) on a cleared or refreshed indication on the display unit 5 by the manual operating unit 6 for another scroll of indication, and this procedure may be repeated as often as desired.

As described hereinabove, the driver of the vehicle may readily and positively identify in which direction his vehicle is travelling by referring a current path of travel as visually indicated on the screen of the display unit 5 to the pattern of a road on the map shown on the display screen. More particularly, even if there has been an accumulated error from a relatively long travel of the vehicle up to the moment of inspection by the driver, when a part of the path of travel is specifically compared in reference to a corresponding pattern of a road to be travelled by the vehicle where there exists a specific feature such as the last upper curve shown in FIG. 2, the driver is able to determine his location at this moment more precisely, yet with an easy approximation.

In a current locational detection of the vehicle travelling along a desired or predetermined path of travel by aid of the vehicle travel path indication apparatus as described above, it is to be noted that a current travel path is calculated and indicated visually by way of approximation using a continuous polygonal line which follows the current path of travel of the vehicle. The shorter segment of a single vector as obtained from such graphic approximation according to current locational information would naturally result in a closer approximation to the actual current curvilinear aspect of the road to be followed by the vehicle, thus providing a better locating precision.

However, a problem arises with respect to an undue increase of the required memory capacity proportional to a greater number of locational data presenting such relatively short vector segments to be stored in the path of travel storage unit 4.

The present invention is essentially directed toward overcoming the above-described shortcomings attendant the prior travel route indication unit, which shortcomings have not heretofore been overcome with satisfactory results.

SUMMARY OF THE INVENTION

A primary object of the present invention is to provide an improved travel route indicating apparatus, adapted for use in an automotive vehicle, which minimizes the memory capacity while at the same time providing a relatively high accuracy in approximating a current locational indication of the vehicle.

A further object of the invention is to provide an improved fixed range indicating system for use in an automotive vehicle travel path indicating apparatus which provides a relatively high precision of visual indication of a current path of travel of the vehicle with as minimized a storage capacity as possible. Such advantages are attained by discretely storing locational data obtained from discrete arithmetical calculation made at a suitable predetermined interval to present relatively short vector segments optimized in accordance with a given scale of indication on the display.

The present invention provides an improved vehicle travel route indicating apparatus which incorporates therein an improved fixed range indicating system providing relatively high accuracy of visual indication of a current path of travel of the automotive vehicle with as minimized a storage capacity as possible, by discretely storing locational data obtained from arithmetical calculation made at an optimal predetermined interval corresponding to a given scale of indication, while constantly marking a current locational calculation. Relatively short vector segments are provided in an attempt to provide a high accuracy of approximation in locational detection, in consideration of the fact that there is no need to present too precise an approach for a graphic approximation in the visual indication.

The above and further objects, details and advantages of the present invention will become apparent from the following detailed description, when read in conjunction with the accompanying drawings.

DETAILED DESCRIPTION OF PREFERRED EMBODIMENTS

Figure 1:
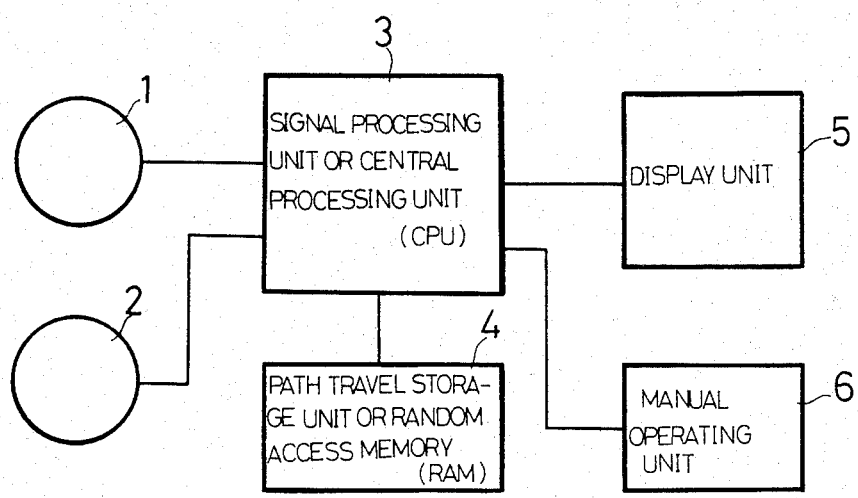
FIG. 1 is a schematic block diagram generally showing the construction of a typical vehicle travel route indicating apparatus.
Figure 2:
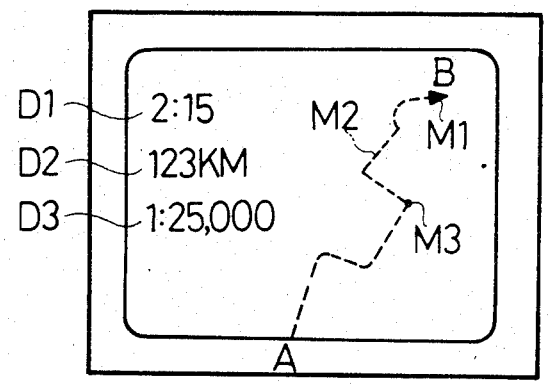
FIG. 2 is a schematic view showing a typical visual indication on a display unit in use for the vehicle travel route indicating apparatus shown in FIG. 1.
Figure 3:
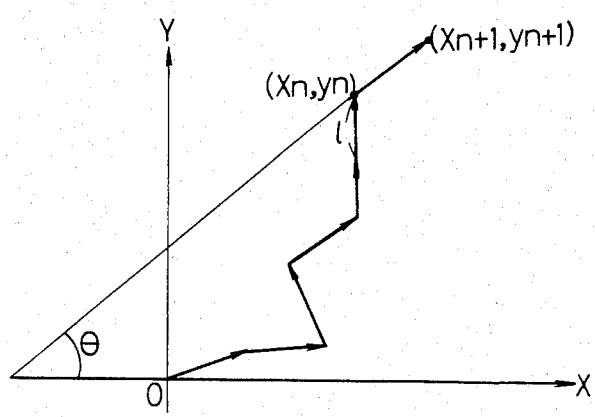
FIG. 3 is a graphic representation showing a typical example of visual indication by way of a polygonal graph consisting of vector segments having changing directivity.

When performing the arithmetical operation for obtaining current location of the vehicle on the two-dimensional coordinates at every predetermined unit travel distance 1 thereof as predetermined by way of the signal processing unit 3 in accordance with the pulses and the bearing detection signals from the pulse generator 1 and the bearing detection unit 2, as typically shown in FIG. 3, such current locational data of the vehicle $(X_{n+1}, Y_{n+1})$ may be obtained from the following equation, i.e.,:

$$X_{n+1} = X_n + 1 \cdot \cos \theta$$

$$Y_{n+1} = Y_n + 1 \cdot \sin \theta$$

where, "1" represents a unit distance of travel; $(X_{n+1}, Y_{n+1})$ represents a current location; $(X_n, Y_n)$ represents a location immediately before the current location; and θ represents a current direction or orientation.

In a typical example of the fixed range indicating system in use for the vehicle travel path indicating unit according to the present invention, the current locational data of the vehicle is obtained from the arithmetical operation as per the equation (1) above at every travel distance of "1". The value "1" is set, for example, to be 1.57 meters. The location of the vehicle, changing from time to time, is thus sequentially obtained, while the locational data is discretely delivered at an interval of 10 meters of the travel distance of the vehicle to the travel path storage unit 4. More specifically, as shown by way of example in the following table, the locational data $D_7$ taken at the moment that the vehicle has travelled 10.99 meters from the starting point 0, and the data $D_{12}$ taken at the moment that the vehicle has passed 20.41 meters therefrom . . . are stored only in the travel path storage unit 4. The current travel path and the current location are indicated sequentially by using unit vector segments in accordance with the discrete locational data $D_7$, $D_{12}$, . . . which are extracted at the predetermined interval from time to time on the display unit 5.

TABLE

| Travel Distance | Locational Data | Contents of Storage |
| --- | --- | --- |
| 0 | $D_0$ | $D_0$ |
| 1.57 | $D_1$ | |
| 3.14 | $D_2$ | |
| 4.71 | $D_3$ | |
| 6.28 | $D_4$ | |
| 7.85 | $D_5$ | |
| 9.42 | $D_6$ | |
| 10.99 | $D_7$ | $D_7$ |
| 12.56 | $D_8$ | |
| 14.13 | $D_9$ | |
| 15.70 | $D_{10}$ | |
| 17.27 | $D_{11}$ | |
| 20.41 | $D_{12}$ | $D_{12}$ |
| . | . | |
| . | . | |
| . | . | |

According to the fixed range indicating system for use in the vehicle travel path indicating unit of this invention, it is advantageously arranged that a series of locational data are accumulated sequentially at each predetermined unit travel distance "1" in the signal processing unit 3. Further, these data are stored in the signal travel path storage unit 4 picked-up discretely from those accumulated at an interval which would not inconveniently affect the recognition of the path of travel of the vehicle displayed on the display unit. Accordingly, the present invention permits the memory capacity of the travel path storage unit 4 to be cut considerably short, while permitting the current path of travel and the current location of the vehicle to be indicated in accordance with the contents of storage in the storage unit on the display unit 5 with a relatively high precision in the simulation of the actual aspects of the road along which the vehicle has travelled.

According to a second feature of the invention, the fixed range indicating system in use for the vehicle travel path indicating apparatus is arranged such that the travel path storage unit 4 is of the so-called "endless memory type" wherein each locational data taken within the limit of travel path indication at the display unit 5 is stored to erase one obsolete piece of information after another in the memory table. Also, it is arranged that there are given, for instance, a series of basic scales of indication such as 1/12500, 1/25000, 1/50000, 1/100000, 1/200000 and 1/400000, each scale differing from the next scale by a factor of 2. The chance of storing of location data in the memory table is such that the locational data for each scale selected from all of the extracted locational data at a rate of one to one, one to two, one to four, one to eight, one to sixteen and one to thirty-two, respectively, . . . so as to be stored into six banks of storage.

By virtue of such advantageous arrangement of locational data storage, the memory capacity of the vehicle travel path storage unit 4 can be markedly decreased while still providing high accuracy of indication of the optimal vehicle travel path and current location which are suitable to the given scale of indication on the display unit 5.

In the above-described embodiment of the invention there is provided a prescribed bank for each given scale of indication on the display. Alternatively, it is of course possible in practice that each of the locational data stored in accordance with the given scale of indication as set by using a single prescribed bank of memories may be discretely read out at an appropriate interval through the signal processing unit 3. The thus-read locational data is transmitted only to the display unit 5. Also, the interval of picking-up or thinning-out the locational data respectively taken at every unit travel distance "1" may be determined by the signal processing unit 3 in accordance with the given scale of indication on the display by the manual operating unit 6.

On the other hand, the arithmetic calculation as to the current locational point of the vehicle in terms of the two-dimensional coordinates by way of the signal processing unit 3 of the invention is advantageously designed such that for the locational data to be selected and stored in the storage unit 4 at the interval of once very 32 chances, for example, a current locational orientation relationship may be indicated properly. Also, as many valid digits as possible may be processed so as to be suited to a computer processing, taking the graphic calculation mode of overflow. In addition, only the upper digits in the results of locational calculation are stored in the travel path storage unit 4 as valid locational data. With such advantageous aspect of the invention, the processing method can substantially effect an optimal high accuracy of locational indication, yet with a minimal memory capacity.

More specifically, there is shown an exemplary case of graphical calculation in which the current point of the vehicle proceeds sequentially by 22.22, giving the motion of current graphic values as follows:

| 1 | 00.00 |
| --- | --- |
| 2 | 22.22 |
| 3 | 44.44 |
| 4 | 66.66 |
| 5 | 88.88 |
| 6 | 1 11.10 |
| 7 | 1 33.32 |
| 8 | 1 55.54 |
| . | . |
| . | . |

It is to be noted that the lower four digits are taken as the current sequential graphic data, neglecting the overflow at the digit of 100 which follows the sixth calculation set forth above, and only the remaining upper two digits are adopted from these four as the valid locational data to be stored in the memory table.

In this connection, the required locational data is taken out from the corresponding bank of memories to the data table for indication after the vehicle has travelled a predetermined distance corresponding to the given basic scale of indication in accordance with the current coordinated train of points which were sequentially stored in terms of the upper digits in the memory table, so as to be delivered to the display unit 5. In this process, the overflow of the upper digits of the data is corrected by the signal processing unit 3 sequentially from the data of the current location, the graphic location being restored by the multiplication of a constant corresponding to the given scale of indication.

More specifically, the restoration of a locational data based on the data read out from the memory table is performed taking, for instance, the eighth calculation as the current location as follows:

| 8 | 55 − 55 = 0 | → | 00 |
| 7 | 33 − 55 = −22 | → | −22 |
| 6 | 11 − 33 = −44 | → | −44 |
| 5 | 88 − 11 = (−11)* − 11 = −22 | → | −66 |
| 4 | 66 − 88 = −22 | → | −88 |
| 3 | 44 − 66 = −22 | → | −110 |
| 2 | 22 − 44 = −22 | → | −132 |
| 1 | 0 − 22 = −22 | → | −152 |

Note:
*designates binary subtraction.

According to such processing as described hereinabove, a truncation error is advantageously decreased by virtue of the fact that accumulation is effected up to the lower two digits, thus reflecting a high accuracy in locational indication on the display unit 5.

In the employment of the processing system as described hereinabove, according to the fixed range indicating system for use in the vehicle travel route indicate apparatus of the present invention, all the visual indication marks in sequence for indicating the path of travel of the vehicle on the display unit 5 through the signal processing unit 3 are once erased at the moment that the vehicle has passed the fixed distance or range corresponding to the selected scale of indication. A potential positition of indication to be refreshed from the previous mark indicating position for the current location of the vehicle is not indexed from the scale of indication given at the time. From these points, the contents of the data table for indication from which each locational data is sequentially taken by the specified bank of memories, as described above, are multipled by the specified scale of indication. The thus-obtained potential position is plotted for the refreshed series of points on the display screen of the display unit 5, whereby a new series of indication points is accordingly rewritten every fixed range to be travelled by the vehicle.

Figure 4:
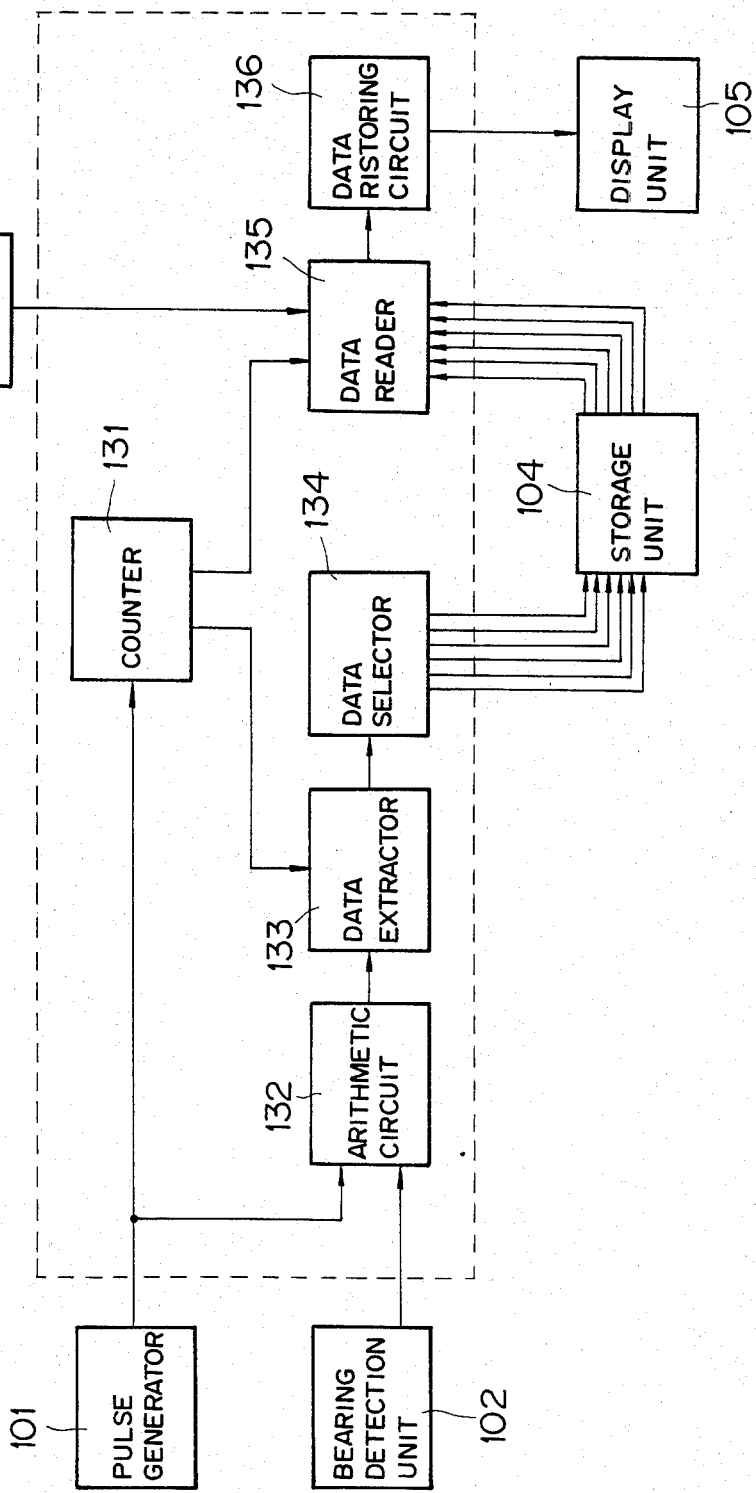
FIG. 4 is a block diagram illustrating the data transmission process according to the invention.

FIG. 4 depicts a block diagram illustrating the above-described data transmission process. The elements surrounded by the broken line, i.e., the counter, arithmetic circuit, data extractor, data selector, data reader and data restoring circuit, provide the function of the CPU. A pulse generator 101 generates a pulse at every moment when the travel distance of the vehicle increases by a predetermined first distance "1". The pulse is input to a counter 131 to be counted and to an arithmetic circuit 132 to be arithmetically processed. A bearing detection unit 102 generates a bearing signal $\theta$ corresponding to the heading of the vehicle. An arithmetic circuit 132 receives the bearing signal $\theta$ and arithmetically obtains a variation of the location of the vehicle on the two-dimensional coordinates from the first distance "1" and the bearing signal $\theta$ at every moment when receiving the pulse. The variations of location are accumulated as locational data of the vehicle which is updated at every moment when receiving the pulse. The locational data is extracted by a data extractor 133. The data extractor reads out the number registered in the counter to detect the travel distance of the vehicle and extracts the locational data from the outputs of the arithmetic circuit at every moment when the travel distance of the vehicle increases by a predetermined second distance (d) which is greater than the first distance "1".

A selection signal is generated by a scale selector 106 to be transmitted to a data reader 135. The scale selector selects one scale of the indication of the travel path from a plurality of predetermined scales of the indication, and the selection signal indicates the selected scale. A data selector 134 selects the locational data from all of the extracted locational data at each rate predetermined in accordance with each of the scales of the indication, and the locational data selected for each of the scales of the indication forms a data group, respectively, each of which is discretely output from the data selector 134. The data group is input to a storage unit 104, including a plurality of data tables each adapted for storing one of the data groups, and each of the selected locational data is stored in the data table as a data fraction in the manner of endless memory mode.

The data reader 135 reads out the number registered in the counter to detect the travel distance of the vehicle, while receiving the selection signal. Based on this information, the data reader reads out the data fraction from the memory tables for the selected scale to output the data fraction at every moment when the travel distance of the vehicle increases by a fixed range. The fixed range is predetermined in accordance with the selected scale, and is greater than the second distance (d). A locational data is restored by a data restoring circuit 136 based on the data fraction output from the data reader 135, and the restored locational data is transmitted to the display unit 105 which indicates the vehicle travel path on a screen in accordance with the restored locational data.

With such advantageous arrangement by way of the fixed range indication, an efficient indication of travel path taken by the vehicle may be achieved with a high accuracy by shifting at the moment that the vehicle has passed the fixed range in accordance with the predetermined scale of indication.

At the same time, it may be arranged such that in connection with the rewritten or refreshed indication of the vehicle's travel path made at every moment that the vehicle has travelled the fixed range, when the graphic indication on the display screen of the display unit 5 exceeds the limit frame of visual indication thereof in shifting the indication mark, there is given a warning. Also, when such running-out of the visual indication of the display screen is on its upper limit frame, a visual indication is given by using the previous value of detection at the very point running out of the limit frame only in the orientation concerned, i.e., the upper side of the frame.

As described hereinabove, the present invention provides an improved path of travel indicating apparatus incorporating the fixed range indicating system having the advantage that the current position of the vehicle on two-dimensional coordinates may be obtained arithmetically in accordance with the current output of the pulse generator adapted to generate an electric pulse signal corresponding to a current travel distance and the current output of the bearing detection unit for detecting a current bearing deviation of the vehicle while in travel. The continuous path of travel of the vehicle is indicated visually on the display screen while the thus-obtained current locational data changing from time to time is sequentially stored. Means are provided for calculating arithmetically the current location of the vehicle by adding current travel distances taken at the given unit travel distance, and extracting the data as to the current location at the moment that said travel distance exceeds the certain predetermined constant value. Also provided are means for presenting a plurality of basic scales of indication varying with doubled denominators in accordance with a given variety of scales of indication, picking-up discretely the locational data at a rate corresponding to the basic scales of indication, respectively, and storing the thus-picked locational data into prescribed memory tables within a given limit of indication by way of a so-called "endless store mode", respectively. Further, there is provided means for once erasing the current indicated path of travel on the display at the interval of the fixed range travelled by the vehicle corresponding to the basic scales of indication, and determining refreshed points of indication for a new location of the vehicle in accordance with the given scale of indication from the current points of indication for the current location at the time of erasing on the basis of the locational data read out from the memory table. Accordingly, there is efficiently provided a high accuracy of locational indication as to the current travel path and current location to be shifted at the moment that the vehicle has travelled the fixed range in accordance with the predetermined scale of indication, yet with a minimal memory capacity.

It will be understood that the objects set forth hereinabove, among those made apparent from the preceding description, are efficiently attained. Because certain changes and modifications may be made in the foregoing description without departing from the spirit and scope of the invention, it is intended that the foregoing description shall be interpreted as illustrative and not restrictive. The scope of the invention is indicated by the appended claims.

We claim:

1. A fixed range indication system for use in a vehicle travel path indicating apparatus, comprising:
   a pulse generator for generating a pulse at every moment when the travel distance of the vehicle increases by a predetermined first distance ("1");
   counter means for counting said pulse;
   a bearing detection unit for generating a bearing signal ($\theta$) corresponding to the heading of the vehicle;
   arithmetic operation means for receiving said bearing signal ($\theta$), arithmetically obtaining a variation of the location of the vehicle on the two-dimensional coordinates from said first distance ("1") and said bearing signal ($\theta$) at every moment when receiving said pulse, and accumulating said variation of location to obtain and output a locational data of the vehicle which is updated at every moment when receiving said pulse;
   data extractor means for reading out the number registered in said counter to detect the travel distance of the vehicle and extracting the locational data from the outputs of said arithmetic operation means at every moment when the travel distance of the vehicle increases by a predetermined second distance (d) which is greater than said first distance ("1");
   scale selector means for selecting one scale of the indication of the travel path from a plurality of predetermined scales of the indication and generating a selection signal indicating a selected scale;
   data selector means for selecting the locational data from all of said extracted locational data at each rate predetermined in accordance with each said scale of the indication, the locational data selected for each said scale of the indication forming a data group, respectively, each said data group being discretely output from said data selector means;
   data storing means including a plurality of data tables each adapted for storing one of said data groups and a storing system for storing each of said selected locational data in said data table as a data fraction in the manner of endless memory mode;
   data reading means for reading out the number registered in said counter to detect the travel distance of the vehicle, receiving said selection signal, and reading out said data fraction from said memory table for said selected scale to output said data fraction at every moment when the travel distance of the vehicle increases by a fixed range predetermined in accordance with said selected scale, said fixed range being greater than said second distance (d);
   data restoring means for restoring a locational data based on said data fraction output from said reading means; and
   display means for receiving said restored locational data and indicating the vehicle travel path on a screen in accordance with said restored locational data.

* * * * *